United States Patent [19]
Schwaller et al.

[11] Patent Number: 5,384,693
[45] Date of Patent: Jan. 24, 1995

[54] TAIL LIGHT FOR A BICYCLE

[75] Inventors: Edwin Schwaller, Kuttingen; Walter Zürcher, Aarau, both of Switzerland

[73] Assignee: Vereinigte Drahtwerke A.G., Biel, Switzerland

[21] Appl. No.: 43,504

[22] Filed: Apr. 6, 1993

[30] Foreign Application Priority Data

Apr. 14, 1992 [CH] Switzerland .................. 1231/92

[51] Int. Cl.⁶ ..................... B62J 6/04; F21V 7/04
[52] U.S. Cl. ..................... 362/72; 362/184; 362/297; 362/346; 362/800; 340/432
[58] Field of Search ............. 362/72, 184, 227, 297, 362/310, 346, 800, 61, 83.3, 301, 299, 252; 340/432

[56] References Cited

U.S. PATENT DOCUMENTS

| | | | |
|---|---|---|---|
| 2,694,138 | 11/1954 | Schwinn | 362/102 |
| 4,845,599 | 7/1989 | Lievin | 362/72 |
| 4,860,177 | 8/1989 | Simms | 362/72 |
| 5,006,971 | 4/1991 | Jenkins | 362/800 |
| 5,101,326 | 3/1992 | Roney | 362/800 |

FOREIGN PATENT DOCUMENTS

| | | |
|---|---|---|
| 0274675 | 7/1988 | European Pat. Off. . |
| 2276980 | 7/1954 | France . |
| 1053465 | 12/1987 | France . |
| 2953938 | 9/1982 | Germany . |
| 3832109 | 3/1990 | Germany ............ 362/72 |
| 198136 | 4/1982 | Japan ............ 362/72 |
| 745183 | 9/1954 | United Kingdom . |

*Primary Examiner*—Ira S. Lazarus
*Assistant Examiner*—L. Heyman
*Attorney, Agent, or Firm*—Ladas & Parry

[57] ABSTRACT

The tail light comprises several light emitting diodes used as light sources. At least one of these diodes generates light emitted into a backward direction. The other diodes are emitting light into lateral and upward directions. For this purpose an arrangement of reflecting surfaces deflects part of the light of the diodes upwardly. In this way it is possible to reach a required light distribution at a considerably reduced power consumption.

12 Claims, 3 Drawing Sheets

TAIL LIGHT FOR A BICYCLE

BACKGROUND OF THE INVENTION

1. Field of the Invention

The invention relates to a tail light for a bicycle with semiconductor light sources.

2. Description of the Prior Art

Conventional tail lights are operated with incandescent light bulbs. These bulbs emit light nearly homogeneously over a large spatial angle. This makes it possible to construct a tail light with sufficient light intensity in backward, upward and lateral directions using a single light bulb. Such a wide distribution of emitted light is required by legal security regulations (see e.g. Section 67, TA 14 of the German StVZO).

The bulbs that are used in conventional tail lights have a nominal operation voltage of approximately 6 V and a power consumption of 0.6 W. They show an average life time of approximately 100 hours because the filaments are damaged easily. It would be preferable, however, to reduce power consumption such that sufficient illumination is generated at a slow bicycle speed and part of the dynamo power can be used for charging an accumulator at high bicycle speed. It should also be possible to operate the light plant when the bicycle has stopped. At the same time, the life time of the light source should be increased.

SUMMARY OF THE INVENTION

Hence, it is a general object of the present invention to design a tail light with a reduced power consumption and an increased life time, which generates the required spatial light distribution.

Now, in order to implement these and still further objects of the invention, which will become more readily apparent as the description proceeds, the invention is manifested by the features that the tail light comprises several light emitting diodes. At least one of the diodes is oriented to emit light directly in an axial backward direction. A least another one of the diodes is combined with a mirror to emit light in lateral and upward directions.

By using light emitting diodes, the power consumption can be reduced to half of the normal value, i.e. to approximately 0.3 W. Since each light emitting diode can be operated at a voltage of 2V, sufficient illumination can be reached from a bicycle speed as low as 3 km/h. In spite of the strongly directed emission characteristics of light diodes, the use of reflecting mirror surfaces allows to achieve the required light distribution with two or three light emitting diodes only. The life time of the diodes is up to 100'000 hours because they do not have any fragile filaments.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
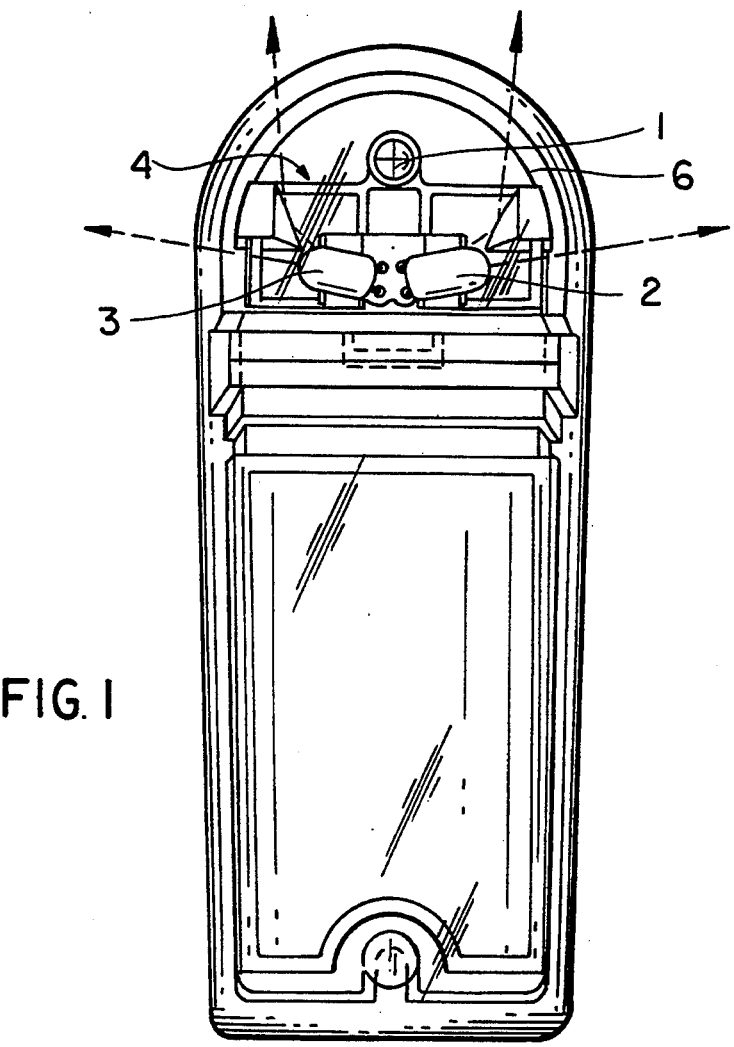
FIG. 1 shows a back view onto a first embodiment of the tail light.
Figure 2:
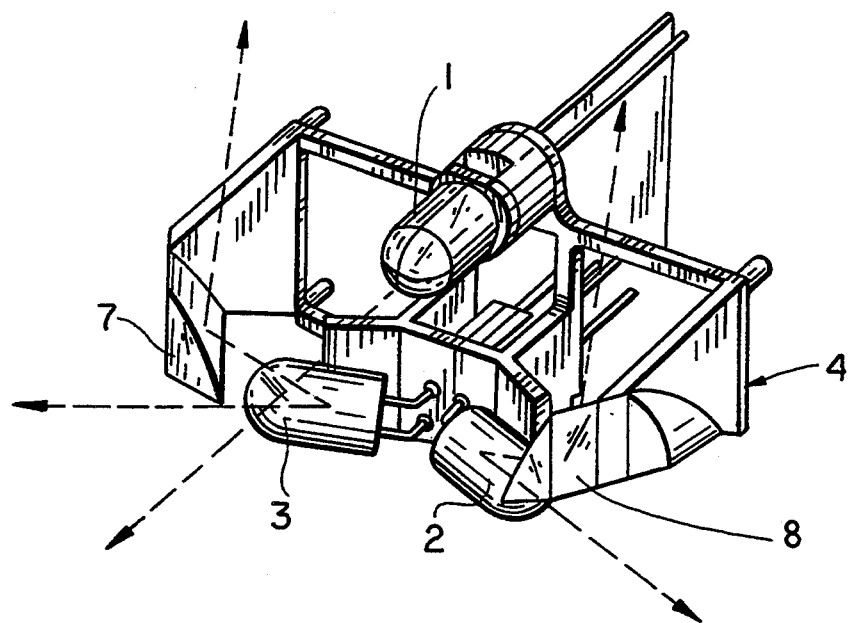
FIG. 2 shows the support of this tail light with three light emitting diodes in perspective view.

A first embodiment with three or four light emitting diodes 1, 2 and 3 is shown in FIGS. 1-6. The light emitting diodes are mounted on a support 4, which also carries reflecting surfaces as explained below. The support 4 is arranged in an essentially conventional tail light housing 5. The cover 6 is, however, made from a plastic that is transparent in the whole visible light spectrum because usually red light emitting diodes are used. In this way, light losses in the cover 6 are minimized.

One (or two, cf. FIG. 5) of the light emitting diodes is arranged axially and emits light in a backward direction. A GaAlAs-LED with comparatively strongly bundled emission characteristic can be used for this purpose, e.g. with a half width value at 5°.

The light of this diode 1 (1') is therefore used without additional optical deflection.

The two other light emitting diodes 2, 3 are provided as off-axis diodes for generating sufficient illumination in lateral and upward directions. The lateral light distribution must reach a forward angle of at least 20°. In upward direction a forward angle of at least 45° must be reached. The axes of the light emitting diodes 2, 3 are aligned in lateral directions as it can e.g. be seen from FIG. 6. Preferably, GaAlAs-LED with a half width of 45° are used. Due to the lateral orientation of these widely emitting LEDs, light is emitted under forward angles of up to 20° (cf. FIG. 6).

Two lateral mirrors 7, 8 are provided for deflecting light in upward directions. By means of these mirrors a part of the light of each of the diodes 2, 3 is directed upwardly. The mirrors 7, 8 are formed as convex, cylindrical surfaces, such that the reflected light forms a light cone that opens upwardly. The axes of the cylindric mirrors 7, 8 are perpendicular to the axes of the respective light diodes 2, 3 and are therefore arranged under an angle to the forward direction. In this way it is possible to have light reflected forwardly into forward angles of up to 45°. The emission zones of the two mirrors 7, 8 are overlapping centrally.

The light emitting diodes are arranged on the support 4. The support can be made of metal or of cast molded plastic. It is formed to provide the reflecting surfaces 7, 8. The support 4 is resting on and positioned in the cover 6 by means of lateral projections 9, 10. The support 4 is completely or partially (at least in the areas of the mirrors 7, 8) covered with a reflecting coating. Alternatively, reflecting foils can be attached to its surfaces.

To increase the light intensity, more than three diodes can be used. In a preferred modification, an additional light emitting diode 1' (cf. FIG. 5) is arranged beside or above the diode 1. The additional diode 1' is aligned parallel to the diode 1 for emitting light in a backward direction.

Figure 7:
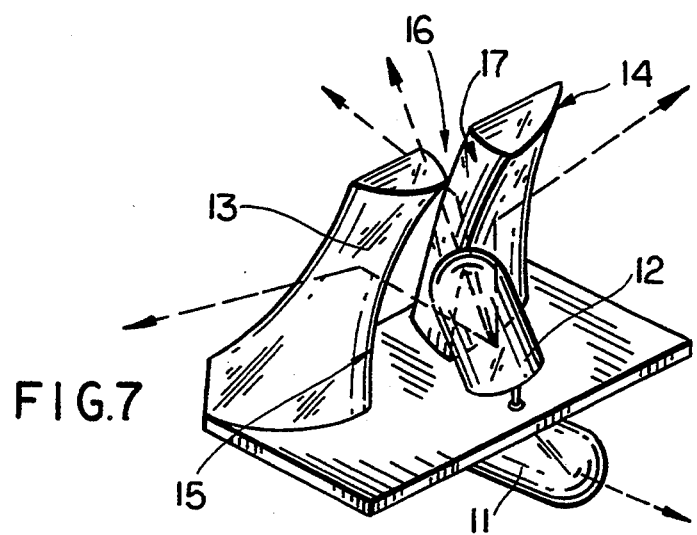
FIG. 7 is a second embodiment of a support with two light emitting diodes.

While three or more diodes are used in the embodiment described above, the required light distribution can also be generated with only two diodes by using a more complex arrangement of mirrors. A corresponding embodiment is shown in FIG. 7. Light emitted backwardly is again generated by an axially aligned diode 11, as in the embodiment described above. The light for lateral and upward directions is generated by a second off-axis light emitting diode 12. The axis of this diode 12 lies also in the central, vertical plane of the bicycle, but it extends in an upward and forward direction. The reflecting optics is provided by especially formed mirror surfaces. They comprise toric surfaces 13 on both sides, with a parabolic generatrix 14 and parallel, circularly bent directrix 15. These toric surfaces deflect part of the light from the diode 12 in lateral directions. Another part of the light from this diode passing through the gap between the mirror bodies is emitted upwardly. For generating the required cone of light opening upwardly, the reflecting bodies are provided with reflecting surfaces 16, 17 facing the gap. These surfaces are formed as convex cylindrical mirrors. In this way, the light incident on these surfaces is deflected to form the required cone of light.

Figure 3:
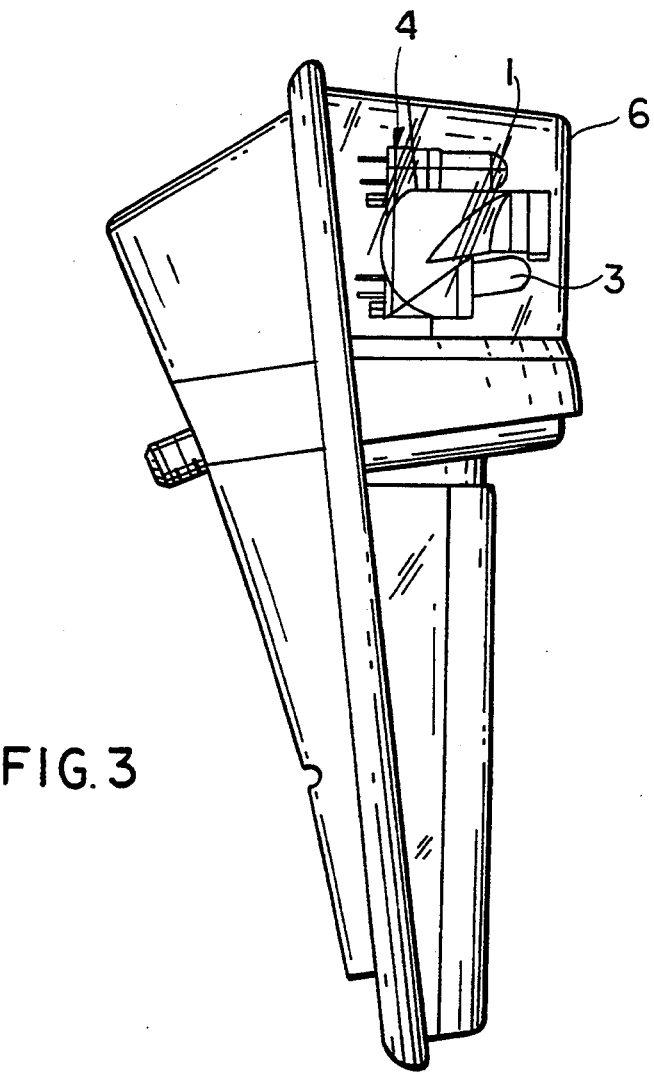
FIG. 3 is a side view of the tail light of FIG. 1.
Figure 4:
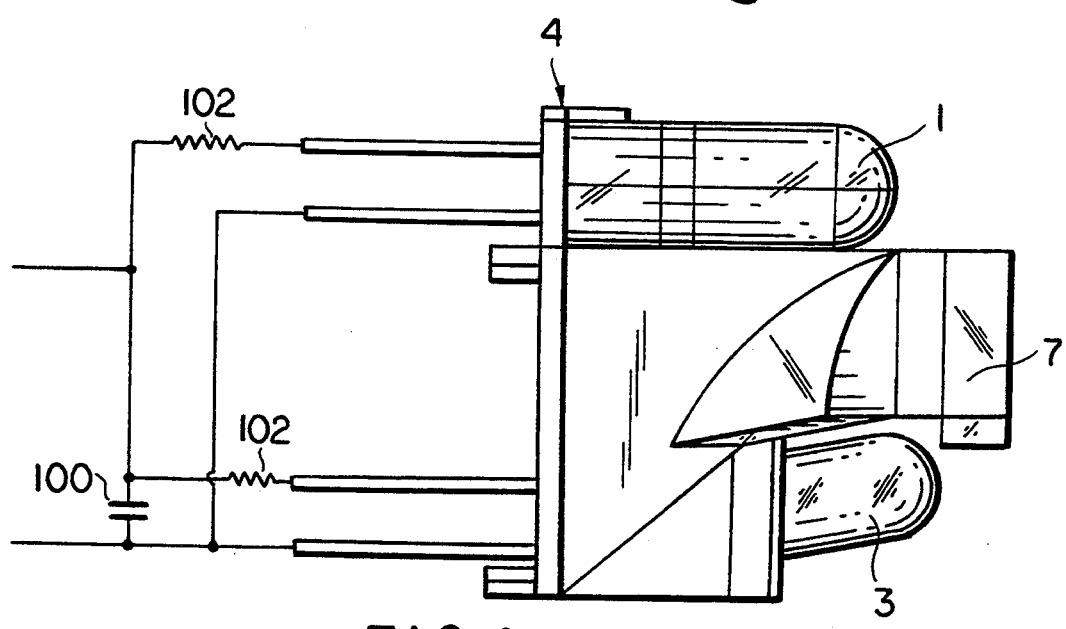
FIG. 4 is a side view of the support of FIG. 2.
Figure 5:
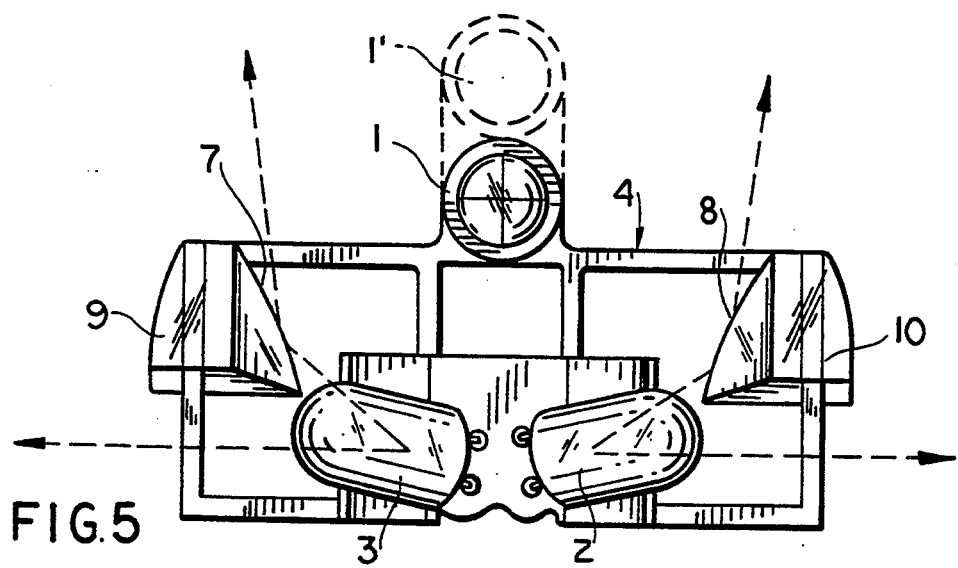
FIG. 5 is a back view of the support shown in FIG. 2.
Figure 6:
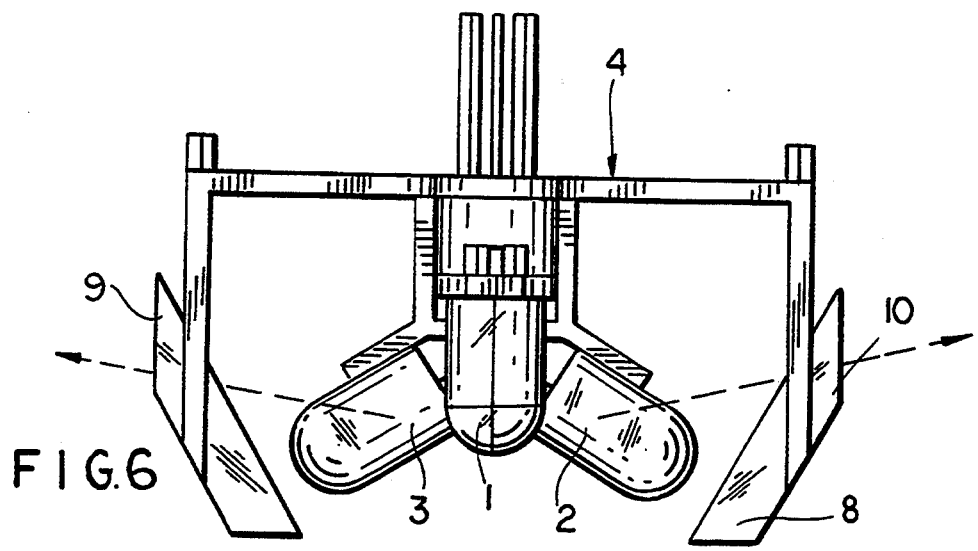
FIG. 6 is a top view of the support of FIG. 2.

The support of this second embodiment can also be inserted into the housing shown in FIGS. 1 and 3. It can also be manufactured by cast molding or by another suitable method.

The inventive tail light can be mounted in a conventional way on the fender of a rear wheel. It is especially suited for being connected to an electric bicycle plant with stabilized voltage and rechargeable battery. A suitable circuit is e.g. described in EP-A-0 460 585.

Since the described tail light has a comparatively low power consumption, it is easy to induce an afterglow effect after switching off its power supply by using a capacitor. This capacitor 100 should be connected parallel to the diodes (and current limiting components 102). The energy of the capacitor is discharged via the diodes to produce the desired effect. Afterglow periods of up to 30 minutes can be reached with commercially available high capacity capacitors.

The inventive tail light has a very high life time and a considerably decreased power consumption. It exhibits the officially required emission characteristic. Furthermore, since considerable light emission occurs at low voltages, the tail light generates sufficient illumination even at low bicycle speeds.

While there is shown and described a present preferred embodiment of the invention, it is to be distinctly understood that the invention is not limited thereto, but may be otherwise variously embodied and practiced within the scope of the following claims.

We claim:

1. A tail light for mounting on a bicycle, said bicycle having a longitudinal axis having a forward and a backward direction, said tail light comprising a tail light assembly within a common housing, said tail light assembly comprising at least a first light emitting diode emitting substantially all light in a limited solid angle cone along an axis of the diode, said diode being mounted to orient said diode along said longitudinal axis to emit light in said backward direction and at least a second light emitting diode being mounted off-axis, wherein part of the light from said second light emitting diode is deflected by at least one reflecting surface, and wherein said second light emitting diode and said reflecting surface are arranged to emit a first part of the light from said second light emitting diode laterally and a second part of the light from said second light emitting diode upwardly.

2. The tail light of claim 1 wherein said at least second light emitting diode comprises two off-axis light emitting diodes oriented to emit light on both sides of the bicycle in lateral directions and wherein said at least one reflecting surface comprises at least two lateral reflecting surfaces, a part of the light from each of said off-axis light emitting diodes being incident on one of said two reflecting surfaces and reflected upwardly.

3. The tail light of claim 2 wherein said at least two reflecting surfaces are convex and wherein said part of light reflected upwardly forms a cone of light opened upwardly.

4. The tail light of claim 2 wherein each of said reflecting surfaces is cylindric with a cylinder axis essentially perpendicular to the axis of the corresponding off-axis light emitting diode.

5. The tail light of claim 1 wherein said second light emitting diode emits light upwardly and forwardly, and wherein a part of the light from said second light emitting diode is incident on said at least said one reflecting surface and reflected into lateral directions.

6. The tail light of claim 5 wherein said at least one reflecting surface comprises at least two reflecting surfaces, a first of said reflecting surfaces reflecting light into a first group of lateral directions and a second of said reflecting surfaces reflecting light into a second group of lateral directions, said first and said second group of lateral directions being substantially opposite.

7. The tail light of claim 6 wherein a gap is formed between said first and said second reflecting surfaces and wherein the walls of said gap are formed by a third and a fourth reflecting surface, said gap and said third and fourth reflecting surface being arranged to form an upwardly opened cone of light.

8. The tail light of claim 1 wherein said first and second light emitting diodes are emitting light in a red spectral range and are arranged under a cover, said cover being transparent substantially in the whole visible spectral range.

9. The tail light of claim 1 comprising a common support for supporting said first and second light emitting diodes, wherein said support is shaped to form said reflecting surfaces.

10. The tail light of claim 9 wherein at least a portion of said support is provided with a reflecting coating.

11. The tail light of claim 1 wherein said at least a first light emitting diode comprises two axially oriented light emitting diodes.

12. The tail light of claim 1 comprising a capacitor, said capacitor being charged during operation of said tail light and being discharged via said light emitting diodes to generate an afterglow after switching off of a voltage supply to said tail light. part of the light from said second light emitting diode is deflected by at least one reflecting surface, and wherein said second light emitting diode and said reflecting surface are arranged to emit a first part of the light from said second light emitting diode laterally and a second part of the light from said second light emitting diode upwardly.

* * * * *